United States Patent [19]

Sherman

[11] Patent Number: 4,997,148

[45] Date of Patent: Mar. 5, 1991

[54] TUBING CLAMP WITH HINGED CUSHION

[75] Inventor: Clarence A. Sherman, Birmingham, Mich.

[73] Assignee: ZSI, Inc., Livonia, Mich.

[21] Appl. No.: 450,676

[22] Filed: Dec. 14, 1989

Related U.S. Application Data

[63] Continuation of Ser. No. 287,007, Dec. 20, 1988, Pat. No. 4,934,635.

[51] Int. Cl.5 ............................................. F16L 3/08
[52] U.S. Cl. ..................................... 248/74.1; 24/279; 248/742
[58] Field of Search ............... 248/74.1, 74.2, 68.1, 248/72, 55, 316.1; 24/284, 278, 279; 285/373; 138/99

[56] References Cited

U.S. PATENT DOCUMENTS

| | | |
|---|---|---|
| 2,011,138 | 8/1935 | Austin . |
| 2,399,899 | 5/1946 | Tinnerman ..................... 248/74.2 X |
| 2,440,469 | 4/1948 | Goddard ............................ 248/68.1 |
| 2,761,714 | 9/1956 | Cuskie . |
| 2,872,141 | 2/1959 | Hefner ................................ 248/62 |
| 2,998,217 | 8/1961 | Englis et al. ...................... 248/74.3 |
| 3,154,281 | 10/1964 | Frank ............................... 248/201 |
| 3,203,653 | 8/1965 | Hall . |
| 3,286,963 | 11/1966 | Bergman . |
| 3,341,232 | 9/1967 | Deakins ........................... 24/279 X |
| 3,370,815 | 2/1968 | Opperthauser ................... 248/74.2 |
| 3,397,431 | 8/1968 | Walker ........................... 248/68.1 X |
| 3,414,220 | 12/1968 | Walker ............................. 248/68.1 |
| 3,429,014 | 2/1969 | Roche ................................. 24/279 |
| 3,486,726 | 12/1969 | Kindorf et al. ...................... 248/72 |
| 3,521,842 | 7/1970 | Opperthauser ................... 248/74.2 |
| 3,553,793 | 1/1971 | Long et al. . |
| 3,606,218 | 9/1971 | Enlund et al. .................... 248/74.2 |
| 3,684,223 | 8/1972 | Logsdon ........................... 248/74.3 |
| 3,843,083 | 10/1974 | Angibaud ........................... 248/229 |
| 3,848,839 | 11/1974 | Tillman ............................. 248/74.2 |
| 4,037,810 | 7/1977 | Pate ................................. 248/68.1 |
| 4,143,844 | 3/1979 | Van Meter . |
| 4,185,802 | 1/1980 | Myles et al. ...................... 248/74.4 |
| 4,267,994 | 5/1981 | Lynch et al. . |
| 4,318,518 | 3/1982 | Davis . |
| 4,417,755 | 11/1983 | Gittleman ........................... 285/373 |
| 4,442,994 | 4/1984 | Logsdon ........................ 248/74.3 X |
| 4,516,296 | 5/1985 | Sherman ....................... 248/68.1 X |
| 4,612,680 | 9/1986 | Daiquii ................................. 14/22 |
| 4,614,321 | 9/1986 | Andre ............................... 248/74.2 |
| 4,640,479 | 2/1987 | Shely et al. .......................... 248/56 |
| 4,653,782 | 3/1987 | Munday ............................. 285/373 |
| 4,744,535 | 5/1988 | Patenaude . |
| 4,934,635 | 6/1990 | Sherman .......................... 248/74.1 |

*Primary Examiner*—Ramon O. Ramirez
*Attorney, Agent, or Firm*—Harness, Dickey & Pierce

[57] ABSTRACT

The present invention is a clamp assembly having two clamp halves. A cushion insert is disposed within the clamp halves to retain a tube, conduit, or other cylindrical member within the clamp assembly. The cushion insert includes means for allowing the cushion insert to flex and be disposed about the tube.

16 Claims, 4 Drawing Sheets

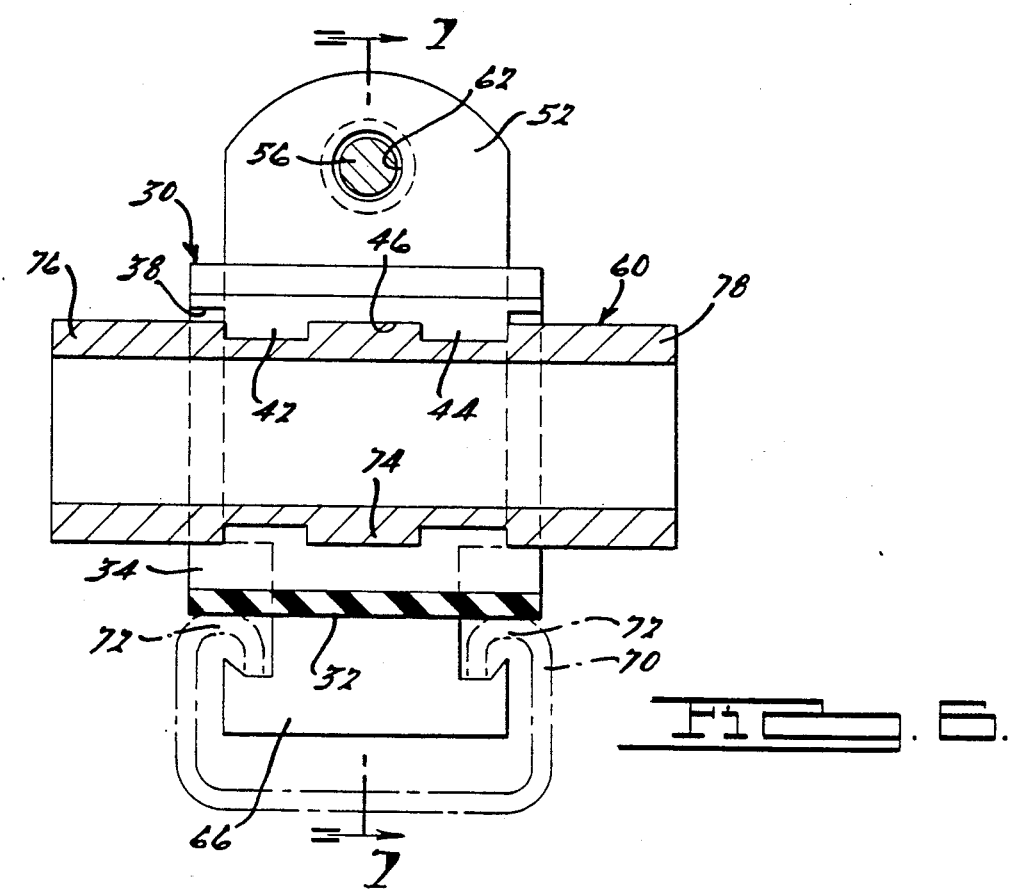
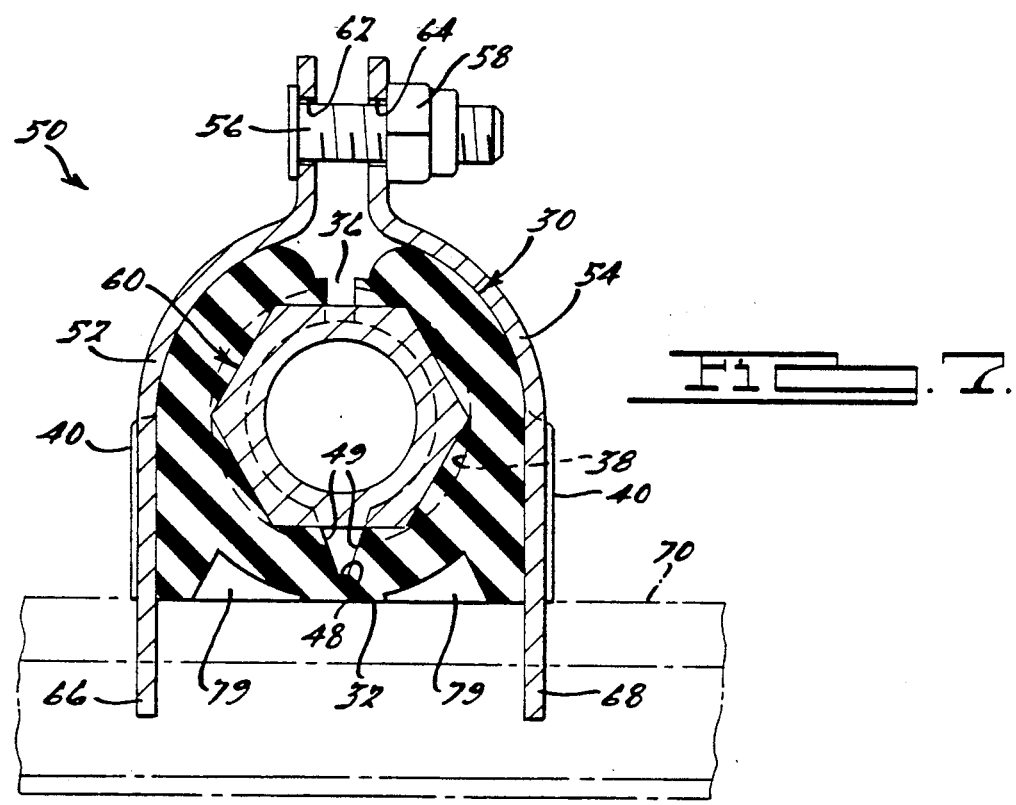

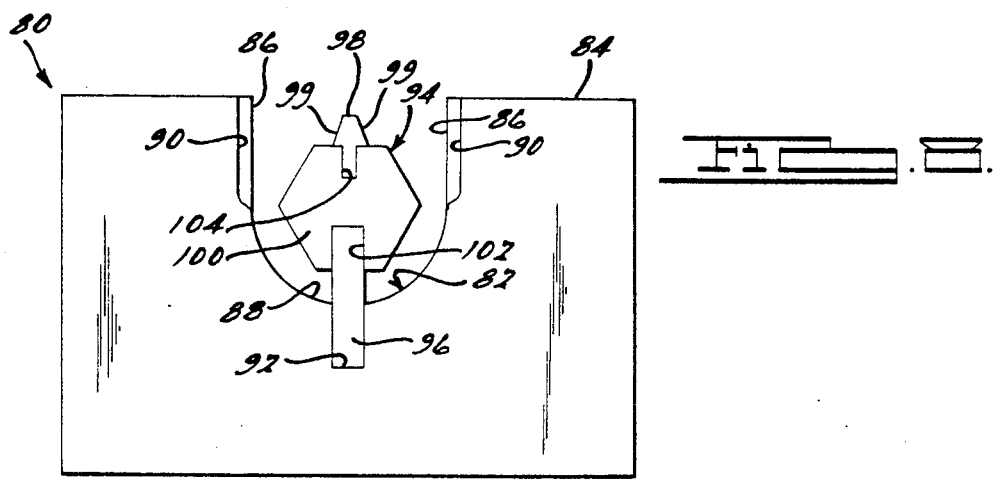
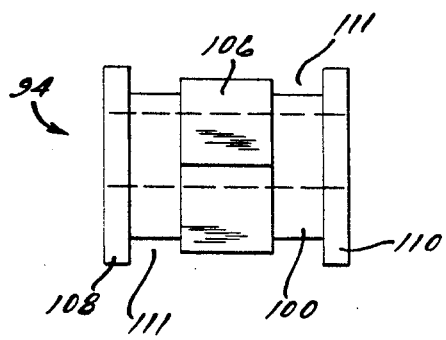
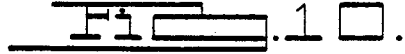
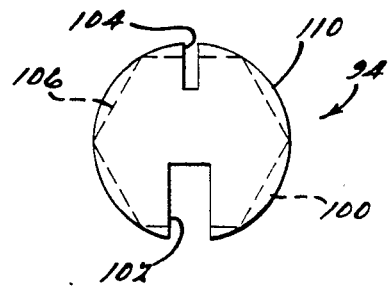
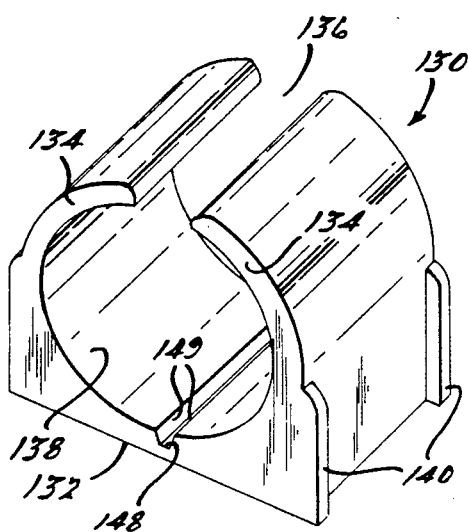
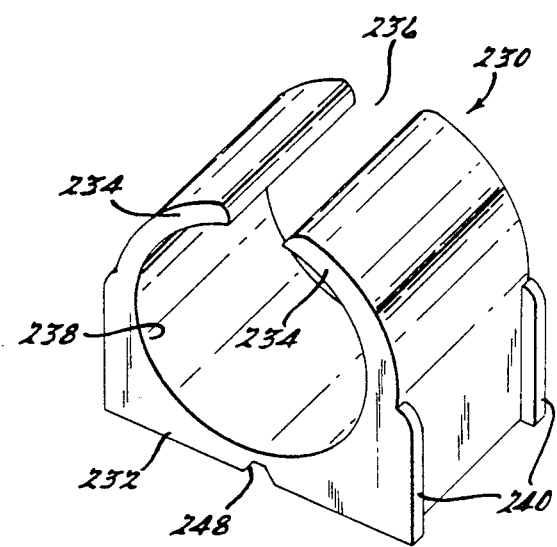
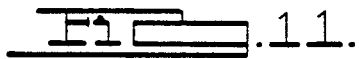
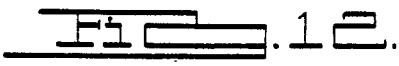

TUBING CLAMP WITH HINGED CUSHION

This is a continuation of U.S. patent application Ser. No. 287,007, filed Dec. 20, 1988, now U.S. Pat. No. 4,934,635.

BACKGROUND OF THE INVENTION

1. Field of the Invention

The present invention relates generally to a two-piece clamp for securing elongated cylindrical members, more particularly, to a two-piece clamp with a cushion for securing an elongated cylindrical member therein.

2. Description of Related Art

Presently, there exists a clamp assembly having two clamp halves and a stud non-rotatably anchored on one of the clamp halves. The stud includes an integral or separable spacer portion which controls the clamping force exerted on the tubing and prevents deformation of the tubing when the stud assembly is tightened.

An example of such a clamp assembly is disclosed in U.S. Pat. No. 4,516,296, issued May 14, 1985, by inventor Clarence A. Sherman, which is hereby incorporated by reference. The patented clamp assembly includes a cushion insert for indirectly engaging the tubing through the elastomeric cushion insert which partially encircles the tubing and is retained within the clamp assembly as illustrated in FIG. 1. The cushion insert 10 includes a generally planar base portion 12 with upwardly and inwardly extending arcuate side walls 14 that substantially encompass the tubing. The ends of the side flanges 14 form a gap 16. The side walls 14 form a smooth continuous passageway 18 extending axially through the cushion insert 10 in which the tubing is disposed. The side walls 14 also include end flanges 20 extending outwardly at the ends of the cushion insert 10 to limit the relative axial movement between a clamp half disposed between the end flanges 20 and the cushion insert 10.

One disadvantage of the above patented clamp assembly is that when small diameter tubes are used, e.g. one-half inch diameter, a large amount of force must be exerted by the operator on the cushion insert to spread the side walls of the cushion insert apart to fit over and about the tube. As a result, the cushion inserts were slid or disposed about one end of the tubing and moved to the desired position along the tubing. Another disadvantage of the above patented clamp assembly is that the cushion insert is used for generally continuous tubing of constant diameter which is used for fluid lines running from a power supply to a machine or the like, e.g. in the fluid power market. Also, the patented clamp assembly is used for typically thin walled copper tubing to prevent the tubing from being deformed if the clamp assembly is over-tightened. However, if the patented clamp assembly is used for thick walled steel tubing or the like, the spacer prevents the clamp halves from being tightened together to the extent required to prevent leaking of a junction between tubing or relative movement between the tubing and clamp assembly.

Currently, a rail mounted system or clamp assembly is used in the fluid power market as illustrated in FIG. 2. Typically, the rail mounted clamp assembly 21 includes a junction adapter or fitting 22 having a square or hexagon nut 23 formed on its outer surface with male or female threaded ends 24. The assembly also includes a rectangular tube or housing 25 about the nut 23 which is adapted to be secured to a support surface. A pair of cylindrical members 26 pass through the housing 25 on both sides of the adapter 22 to prevent rotation of the adapter 22. The cylindrical member 26 has a nut or base 27 at one end abutting the outside of the housing 25 and a fastener 28 which threadably engages the other end of the cylindrical member 26 to secure it to the housing 25. Typical examples of such rail mounted clamp assemblies used in the fluid power market are disclosed in U.S. Pat. No. 3,397,431, issued Aug. 20, 1978, by inventor W. R. Walker and U.S. Pat. No. 3,414,220, issued Dec. 3, 1968, by inventor W. R. Walker.

One disadvantage of the above rail mounted clamp assembly is that it must be disassembled to attach the tubing to the junction adapter or other assembly. Another disadvantage is that a pair of cylindrical members must be used on each side of the nut or the adapter to prevent it from rotating in the housing.

Some examples of other clamp assemblies are disclosed in U. S. Pat. No. 4,037,810, issued July 26, 1977, by inventor Harold T. Pate and U.S. Pat. No. 4,442,994, issued Apr. 17, 1984, by inventor Duane D. Logsdon. Although both of these patents disclose a clamp with a point of flexure, Pate merely discloses a plastic cap or lid hinged to the remaining portion of the plastic clamp to secure tubing therein. Also, Logsdon's pipe hanger would be unsuitable to support the weight of the fluid in the tubing when used for fluid lines in the fluid power market. Further, Logsdon's pipe hanger would be unsuitable for non-constant diameter and non-smooth outer surfaced or discontinuous pipe or tubing and channel or rail mounted systems.

It is, therefore, one object of the present invention to provide an easy-to-use cushion insert to fit over tubing or other cylindrical members of relatively small diameters.

It is another object of the present invention to provide a clamp assembly which can be used for fluid lines in the fluid power market.

It is a further object of the present invention to provide a cushion insert that can be used for non-constant diameter and non-smooth outer surface or discontinuous tubing or other cylindrical members.

It is a still further object of the present invention to provide a clamp assembly that can support the weight of the fluid and tubing or other cylindrical member.

It is another object of the present invention to provide a clamp assembly which prevents rotation of the tubing or other cylindrical member within the clamp assembly.

It is a further object of the present invention to provide a clamp assembly which does not require disassembly to attach the tubing or other cylindrical member to it.

SUMMARY OF THE INVENTION

Accordingly, the present invention is a clamp assembly having two clamp halves. A cushion insert is disposed within the clamp halves to retain a tube or other cylindrical member within the clamp assembly. The cushion insert includes means for allowing the cushion insert to flex and be disposed about the tube or other cylindrical member.

One advantage of the present invention is that the clamp assembly can be used for fluid lines in the fluid power market. Also, the clamp assembly can be used with a channel mounted clamping system. Another advantage of the present invention is that the assembly does not have to be disassembled to attach the tubing or other cylindrical member to it. A further advantage of the present invention is that it can be used for discontinuous tubing, fittings or other cylindrical members. A still further advantage of the present invention is that the cushion insert is molded to prevent rotation of a tube or fitting within the clamp assembly. Another advantage of the present invention is that the cushion insert is more flexible to allow the cushion insert to be disposed over small diameter tubing, providing greater operator convenience. A further advantage of the present invention is that elimination of a spacer between the clamp halves allows the clamp halves to be tightened as much as desired.

Other advantages of the present invention will be readily appreciated as the same become better understood by reference to the following detailed description in view of the accompanying drawings.

BRIEF DESCRIPTION OF THE DRAWINGS

FIG. 6 is a sectional view of the tubing clamp of FIG. 5 taken along line 6—6.

FIG. 7 is a sectional view of the tubing clamp of FIG. 6 taken along line 7—7 shown in full view.

FIG. 8 is an elevational view of a mold cavity for making the cushion insert of FIG. 3.

FIG. 9 is a front elevational view of the core insert for making the cushion insert of FIG. 3.

FIG. 10 is a side elevational view of the core insert of FIG. 9.

FIG. 11 is a perspective view of a first alternate cushion insert according to the principles of the present invention.

FIG. 12 is a perspective view of a second alternate cushion insert according to the principles of the present invention.

DESCRIPTION OF THE PREFERRED EMBODIMENT

Figure 3:
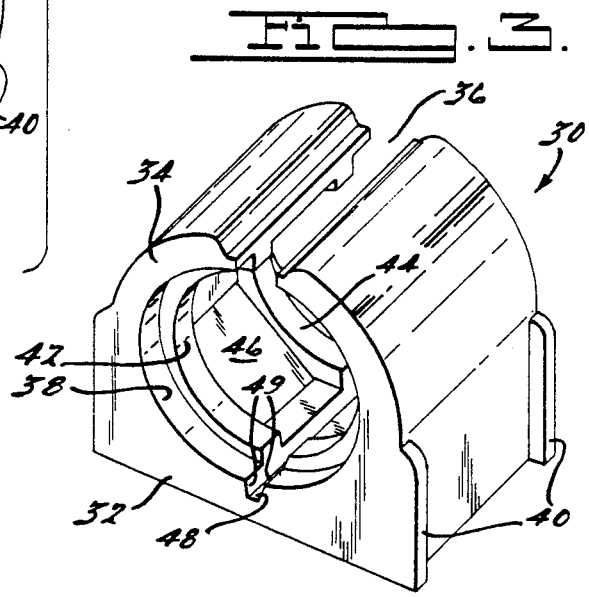
FIG. 3 is a perspective view of a cushion insert according to the principles of the present invention.

Referring to FIG. 3, a cushion insert 30 constructed in accordance with the principles of the present invention is shown. The cushion insert 30 includes a generally planar base portion 32 with upwardly and inwardly extending arcuate side walls 34. The ends of the side walls 34 form a space or gap 36 that allows the side walls 34 to be partially flexed to fit over a tube, conduit, or fitting (not shown in the figure) in a passageway 38 defined by the side walls 34. The passageway 38 extends axially through the cushion insert 30. The side walls 34 also include end flanges 40 extending outwardly and partially upwardly at the ends of the cushion insert 30 to limit relative axial movement between the cushion insert 30 and a clamp half to be described disposed between the end flanges 40. The cushion insert 30 may be made of an elastomeric material such as a thermoplastic elastomer. This material allows the cushion insert 30 to be molded by conventional injection molding.

The cushion insert 30 includes a generally arcuate first interior wall 42 extending radially inwardly into the passageway 38. The cushion insert 30 further includes a generally arcuate second interior wall 44 spaced axially from the first interior wall 42 and extending radially inwardly into the passageway 38. The passageway 38 has a shaped portion 46 between the first and second interior walls 42 and 44 formed to a predetermined shape such as that of a hexagon. It should be appreciated that a corresponding object such as a fitting 60 to be described is disposed in the shaped portion 46 of the passageway 38. The shaped portion 46 is molded to secure the fitting 60 and prevent the fitting 60 from rotating or turning even when wrench force is applied. The fitting 60 is also limited from axial movement by the first and second interior walls 42 and 44.

Figure 1:
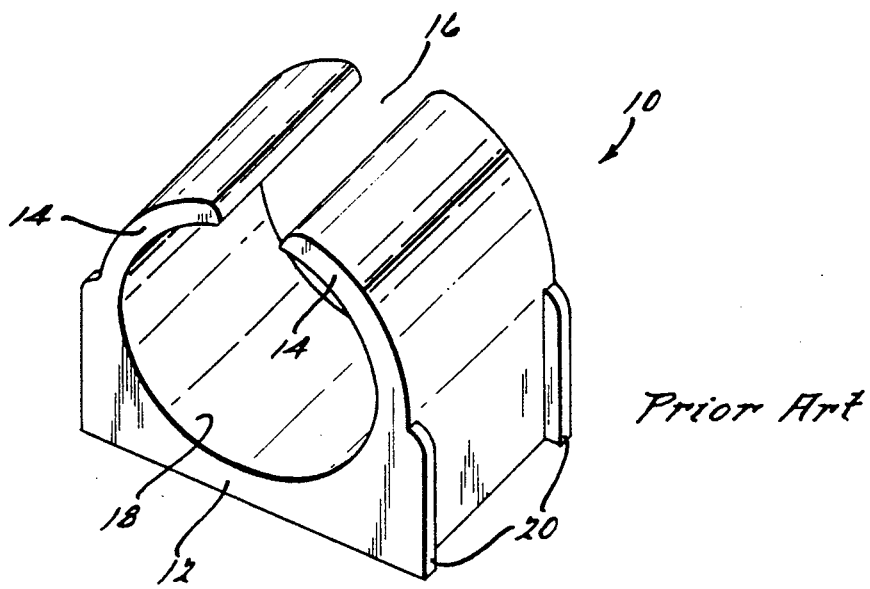
FIG. 1 is a perspective view of a prior art elastomeric cushion insert.
Figure 2:
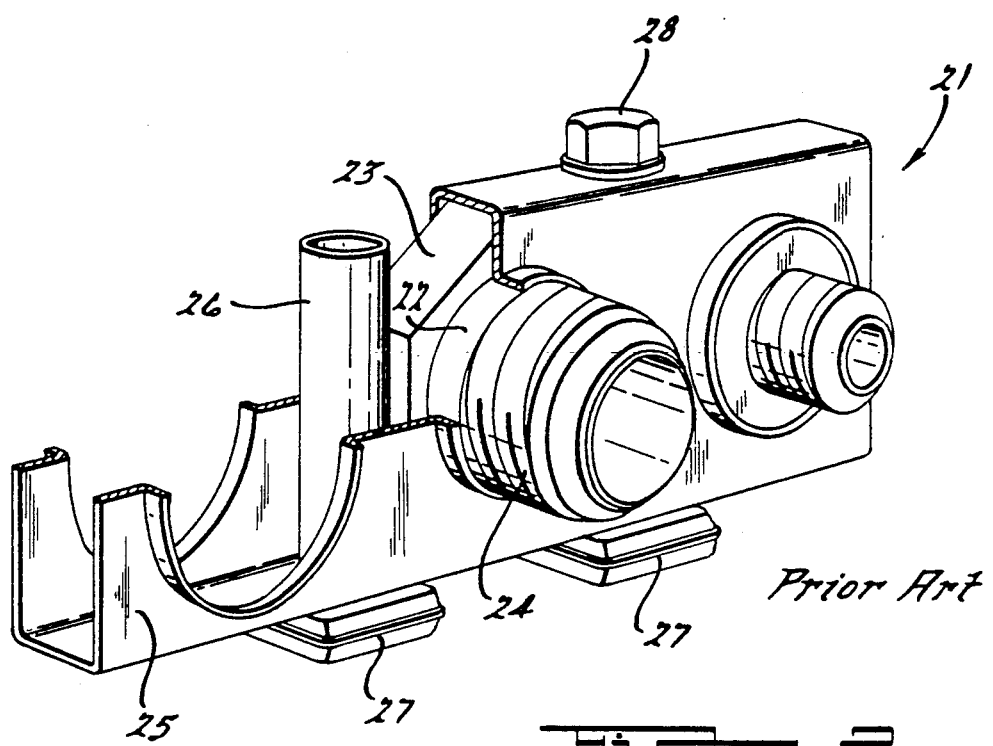
FIG. 2 is a perspective view of a prior art clamp assembly for a rail mounted system used in the fluid power market.
Figure 4:
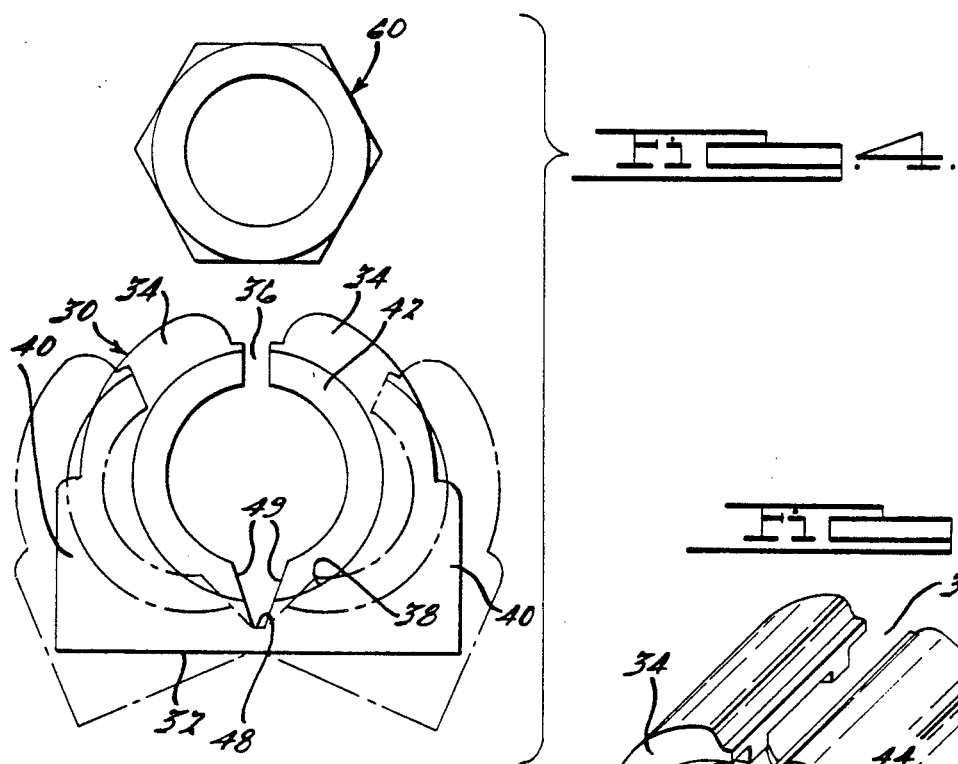
FIG. 4 is a front elevational view of the cushion insert of FIG. 3 with the side walls spread apart in phantom lines.

The cushion insert 30 also includes a slot or groove 48 formed axially along the bottom surface of the passageway 38. The slot 48 acts as a living hinge and allows additional flexure of the side walls 34 permitting them to be spread apart and over a tube, conduit or fitting 60, especially at small outside diameters, e.g. outside diameter of 0.5 inches as illustrated in FIG. 4. This makes installation faster and easier, saving money in labor time as opposed to slipping the cushion insert over one end of the tubing or the like as in the past. The slot 48 is used, preferably, for passageways 38 having a diameter of one-quarter ($\frac{1}{4}$) to one and five-eighths ($1\frac{5}{8}$) inches. It should be appreciated that the side walls 34 of the cushion 30 can be spread apart in a cantilevered manner for passageways 38 having a diameter greater than one and five-eighths ($1\frac{5}{8}$) inches. The slot 48 also has a width of, preferably, 0.03 inches. The slot 48 also includes inclined side walls 49 having an angle of, preferably, thirty (30) degrees with a vertical axis passing through the slot 48 and perpendicular to the base portion 32. It should also be appreciated that the width of slot 48 and inclined side walls 49 allows flexure of the side walls 34 to accomodate tubing or the like having a diameter no greater than the diameter of the passageway 38.

Figure 5:
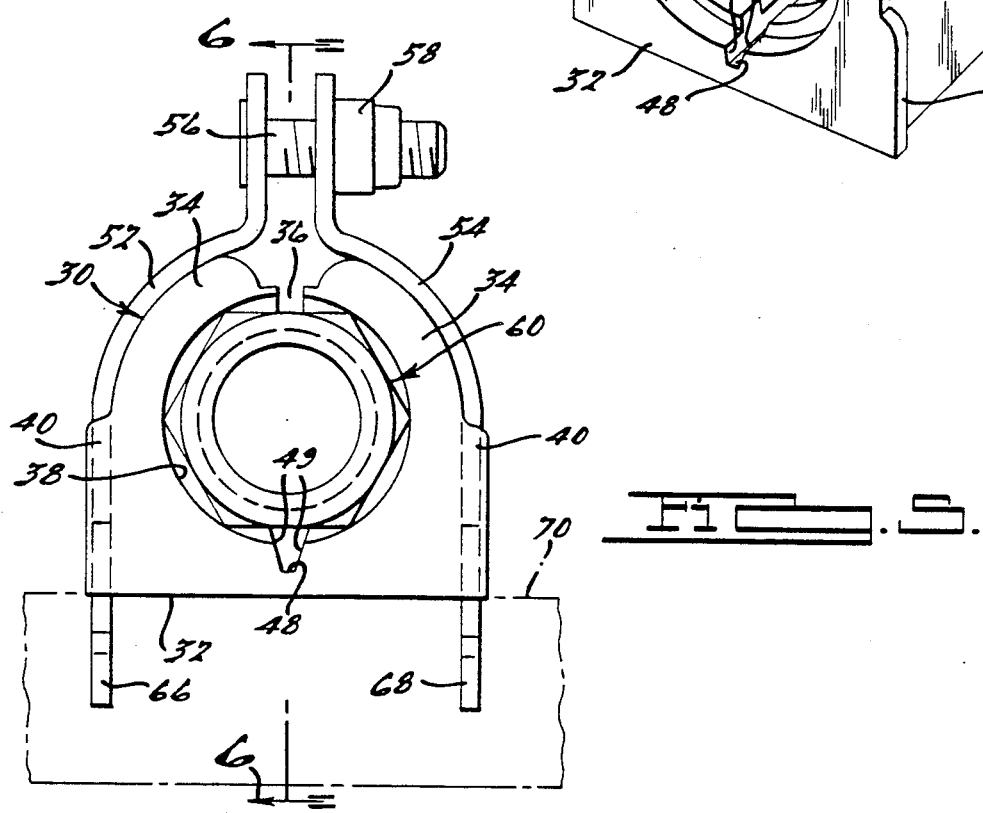
FIG. 5 is a front elevational view of a tubing clamp including the cushion insert of FIG. 3 secured to a channel.

Referring to FIGS. 5 through 7, a tubing clamp assembly 50 of the present invention is generally shown. The clamp assembly 50 comprises first and second clamp halves 52 and 54 which are detachably secured together by means of a threaded fastener 56 and an internally threaded nut 58. The fastener 56 is non-rotatable and press fit into an aperture 62 (FIG. 6) of clamp half 52. The nut 58 is an elastic stopnut. The cushion insert 30 is provided inside the first and second clamp halves 52 and 54 for indirectly engaging a cylindrical member such as a tube, conduit or fitting, generally indicated at 60, through the cushion insert 30 which partially encircles the fitting 60 and is retained within the clamp assembly 50.

The first and second clamp halves 52 and 54 each include a corresponding aperture 62 and 64, respectively, on one end for receiving the fastener 56. The first and second clamp halves 52 and 54 also include generally "T" shaped channel interlocking feet 66 and 68, respectively, provided on the opposite end thereof for engaging a generally U-shaped channel 70 having generally C-shaped ends 72.

The fitting 60 is generally elongated tubular or cylindrical in shape and includes a gripping portion 74 extending radially outwardly from the outer surface of the fitting 60. The gripping portion 74 has a predetermined shape such as a hexagon and is disposed in the corresponding shaped portion 46 of the passageway 38. The first 42 and second 44 interior walls limit the axial movement of the gripping portion 74 of the fitting 60 within the passageway 38. The fitting 60 also includes end portions 76 and 78 which may be male or female to allow a corresponding female or male coupling (not shown) to be threadably secured to the fitting 60. As illustrated in FIG. 7, the base portion 32 may have portions removed from it axially interior of its ends to form pockets 79 which add to the flexibility of the side walls 34 and reduce material cost.

Referring to FIG. 8, a mold cavity 80 for making the cushion insert 30 is shown. The mold cavity 80 fits in a mold (not shown) to allow the cushion insert 30 to be formed by conventional injection molding. The mold cavity 80 is generally rectangular and includes a pocket 82 formed in its upper surface 84. The pocket 82 includes sides 86 which extend generally vertically downward to an arcuate bottom 88. The pocket 82 also includes radially extending ends 90 partially along the sides 86. The pocket 82 further includes a slot or groove 92 extending axially along its bottom 88. A core insert, generally indicated at 94, is disposed in the slot 92 and spaced from the sides 86 and bottom 86 within the pocket 82.

Referring to FIGS. 8 through 10, the core insert 94 includes a pair of blocks 96 and 98 which are generally rectangular in shape and a generally elongated cylindrical member 100. The block 98 includes inclined side portions 99 which form the inclined side walls 49 of the slot 48. The cylindrical member 100 includes opposite disposed slots 102 and 104 formed axially along its outer surface. The first block 96 is partially disposed in the slot 92 of the pocket 82 and the slot 102 of the cylindrical member 100. The second block 98 is partially disposed in the slot 104 and extends upwardly in the pocket 82 of the mold cavity 80. The cylindrical member 100 includes a forming portion 106 extending radially outwardly from its outer surface and has a predetermined shape such as a hexagon. The cylindrical member 100 also has end flanges 108 and 110 extending radially outwardly at its ends. It should be appreciated that the forming portion 106 forms the shaped portion 46 of the cushion insert 30 and spaces 111 formed between the end flanges 108 and 110 which form the interior walls 42 and 44.

Referring to FIG. 11, a first alternate embodiment 130 of the cushion insert 30 is shown. Like parts have like numerals increased by one hundred. The cushion insert 130 has a smooth continuous passageway 138 with a slot 148 having inclined side walls 149 formed, preferably, axially along the bottom of the passageway 138. Referring to FIG. 12, an alternate embodiment 230 of the cushion insert 130 of FIG. 9 is shown. Like parts have like numerals increased by one hundred. The cushion insert 230 includes a slot 248 formed axially along the outer surface of the base portion 232. The slot 248 also has inclined side walls 249. The slot 248 on the outer surface of the base portion 232 gives a more desirable aesthetic appearance to the cushion insert 230. It should be appreciated that the slots 148 and 248 act as a living hinge similar to slot 48 and allow additional flexure of the side walls.

The present invention has been described in an illustrative manner. It is to be understood that the terminology which has been used is intended to be in the nature of words of description rather than of limitation.

Obviously, many modifications or variations of the present invention are possible in light of the above teachings. Therefore, within the scope of the appended claims, the present invention may be practiced otherwise than as specifically described.

What is claimed is:

1. A cushion insert adapted to be disposed about a single cylindrical member, comprising:
    a planar base portion adapted to be supported by a support surface;
    a pair of upwardly and inwardly arcuate side walls at each end of said base portion;
    said side walls having ends which are spaced from each other to form a gap;
    said side walls forming a passageway extending axially through said cushion insert; and
    means disposed in said passageway and conforming with the outer configuration of the cylindrical member for operatively cooperating with the cylindrical member to prevent rotation of the cylindrical member.

2. The cushion insert of claim 1 further comprising means for allowing flexure of said side walls.

3. The cushion insert of claim 2 wherein the flexure means is a slot formed axially across the insert on an inner surface therein and substantially opposite the gap.

4. The cushion insert of claim 2 wherein the flexure means is a slot formed axially across an outer surface of said base portion substantially opposite said gap.

5. The cushion insert according to claim 1 wherein the means disposed in said passageway includes at least two adjacent planar surfaces angled relative to each other at a predetermined angle.

6. The cushion insert according to claim 3 wherein the slot has angled side walls.

7. A cushion insert adapted to be disposed about a cylindrical member, comprising:
    a planar base portion adapted to be supported by a support surface;
    a pair of upwardly and inwardly arcuate side walls at each end of said base portion;
    said side walls having ends which are spaced from each other to form a gap;
    said side walls forming a passageway extending axially through said cushion insert; and
    means disposed within said passageway for limiting axial movement of the cylindrical member.

8. The cushion insert of claim 7 further comprising means for allowing flexure of said side walls.

9. The cushion insert of claim 8 wherein the flexure means is a slot formed axially across the insert on an inner surface therein and substantially opposite the gap.

10. The cushion insert of claim 8 wherein the flexure means is a slot formed axially across an outer surface of said base portion substantially opposite said gap.

11. The cushion insert according to claim 9 wherein the slot has angled side walls.

12. A cushion insert adapted to be disposed about a cylindrical member, comprising:
    a planar base portion adapted to be supported by a support surface;
    a pair of upwardly and inwardly arcuate side walls at each end of said base portion;
    said side walls having ends which are spaced from each other to form a gap;
    said side walls having an inner surface forming a passageway extending axially through said cushion insert; and first and second axially spaced walls extending radially inwardly from said inner surface and abutting a formed shape on the outer surface of the cylindrical member to limit axial movement of the cylindrical member.

13. The cushion insert of claim 12 further comprising means for allowing flexure of said side walls.

14. The cushion insert of claim 13 wherein the flexure means is a slot formed axially across the insert on an inner surface therein and substantially opposite the gap.

15. The cushion insert of claim 13 wherein the flexure means is a slot formed axially across an outer surface of said base portion substantially opposite said gap.

16. The cushion insert according to claim 14 wherein the slot has angled side walls.

* * * * *